(12) United States Patent
Schubert

(10) Patent No.: US 7,629,702 B2
(45) Date of Patent: Dec. 8, 2009

(54) METHOD FOR CONTROLLING A WIND TURBINE AND CORRESPONDING WIND TURBINE

(75) Inventor: Matthias Schubert, Rendsburg (DE)

(73) Assignee: Repower Systems AG, Hamburg (DE)

( * ) Notice: Subject to any disclaimer, the term of this patent is extended or adjusted under 35 U.S.C. 154(b) by 159 days.

(21) Appl. No.: 11/575,528

(22) PCT Filed: Sep. 20, 2005

(86) PCT No.: PCT/EP2005/010125

§ 371 (c)(1),
(2), (4) Date: Mar. 19, 2007

(87) PCT Pub. No.: WO2006/032451

PCT Pub. Date: Mar. 30, 2006

(65) Prior Publication Data

US 2007/0216166 A1 Sep. 20, 2007

(30) Foreign Application Priority Data

Sep. 21, 2004 (DE) .................. 10 2004 046 036
Nov. 11, 2004 (DE) .................. 10 2004 054 608

(51) Int. Cl.
*H02P 9/04* (2006.01)
*F03D 9/00* (2006.01)
(52) U.S. Cl. ................................. 290/44; 290/55
(58) Field of Classification Search .............. 290/44, 290/55
See application file for complete search history.

(56) References Cited

U.S. PATENT DOCUMENTS

| | | | | |
|---|---|---|---|---|
| 2,284,521 A | * | 5/1942 | Insua ........................ | 416/50 |
| 4,160,170 A | * | 7/1979 | Harner et al. ............... | 290/44 |
| 4,161,658 A | | 7/1979 | Patrick ....................... | 290/44 |
| 4,189,648 A | * | 2/1980 | Harner ....................... | 290/44 |
| 4,193,005 A | * | 3/1980 | Kos et al. .................... | 290/44 |
| 4,297,076 A | * | 10/1981 | Donham et al. .............. | 416/37 |

(Continued)

FOREIGN PATENT DOCUMENTS

DE      19844258      3/2000

(Continued)

OTHER PUBLICATIONS

Leithead, W. et al.; "Role and Objectives of Control for Wind Turbines;" IEE Proceedings C. Generation, Transmission, Distribution, Institution of Electrical Engineers; Stevenage; GB, vol. 138, No. 2 Part C; Mar. 1,1991; pp. 135-148; XP000219783.

*Primary Examiner*—Nicholas Ponomarenko
*Assistant Examiner*—Pedro J Cuevas
(74) *Attorney, Agent, or Firm*—Rankin, Hill & Clark LLP

(57) ABSTRACT

Reduction in power output or rotor speed of a wind turbine above a defined limit value, the reduction not being implemented based on the measured wind speed, but on an input value which on one hand is easily detected physically and by control technology and on the other hand is a good indicator of mechanical stresses on the wind turbine. The invention uses the rotor-blade angle as the input value in a manner that starting at the limit value, the reduction in power output or in rotor speed is adjusted as a function of the rotor-blade angle.

15 Claims, 9 Drawing Sheets

U.S. PATENT DOCUMENTS

| | | | |
|---|---|---|---|
| 4,348,155 A * | 9/1982 | Barnes et al. | 416/46 |
| 4,435,646 A * | 3/1984 | Coleman et al. | 290/44 |
| 4,449,053 A * | 5/1984 | Kutcher | 290/44 |
| 4,584,486 A * | 4/1986 | Quynn | 290/44 |
| 4,695,736 A * | 9/1987 | Doman et al. | 290/44 |
| 4,700,081 A * | 10/1987 | Kos et al. | 290/44 |
| 4,703,189 A * | 10/1987 | DiValentin et al. | 290/44 |
| 6,137,187 A * | 10/2000 | Mikhail et al. | 290/44 |
| 6,320,272 B1 * | 11/2001 | Lading et al. | 290/44 |
| 6,809,431 B1 * | 10/2004 | Schippmann | 290/55 |
| 7,081,689 B2 * | 7/2006 | Tilscher et al. | 290/44 |
| 7,345,373 B2 * | 3/2008 | Delmerico et al. | 290/44 |
| 7,352,075 B2 * | 4/2008 | Willey et al. | 290/44 |
| 7,420,289 B2 * | 9/2008 | Wang et al. | 290/44 |
| 7,525,209 B2 * | 4/2009 | Kabatzke et al. | 290/44 |
| 2005/0194787 A1 * | 9/2005 | Tilscher et al. | 290/8 |
| 2007/0120369 A1 * | 5/2007 | Delmerico et al. | 290/44 |
| 2007/0194574 A1 * | 8/2007 | Kabatzke et al. | 290/44 |
| 2007/0205602 A1 * | 9/2007 | Willey et al. | 290/44 |
| 2008/0042441 A1 * | 2/2008 | Kabatzke | 290/44 |
| 2008/0136188 A1 * | 6/2008 | Krueger | 290/44 |
| 2008/0140263 A1 * | 6/2008 | Wang et al. | 700/291 |
| 2009/0068013 A1 * | 3/2009 | Birkemose et al. | 416/31 |
| 2009/0212566 A1 * | 8/2009 | Harms et al. | 290/44 |

FOREIGN PATENT DOCUMENTS

| | | |
|---|---|---|
| DE | 10127451 | 12/2002 |
| DE | 10137272 | 2/2003 |
| DE | 10300733 | 7/2004 |
| WO | 97/09531 | 3/1997 |
| WO | 01/33075 | 5/2001 |
| WO | 2004/077068 | 9/2004 |

* cited by examiner

METHOD FOR CONTROLLING A WIND TURBINE AND CORRESPONDING WIND TURBINE

BACKGROUND OF THE INVENTION

The present invention relates to controlling, i.e. regulating, a wind turbine.

Procedures are already known relating to wind turbines such as that shown in FIG. 10, comprising a rotor hub 1 fitted with at least one blade 2 which is configured at an adjustable rotor-blade angle relative to said rotor. Said known procedures regulate the rotor's speed of rotation, hereafter termed rotor speed, while adjusting the blade angle within a predetermined range of wind speeds to set a predetermined power output.

FIG. 10 further illustrates known elements used n wind turbines, including an actuator 3 for changing rotor blade angles and a sensor 4 for determining the rotor blade angle. A rotor shaft 6 transfers rotational motion to a transmission 7 and further to a generator 8. The generator 8 includes a sensor 9 attached thereto for sensing power output. A signal line 14 transfers information from the generator sensor 9 to a PID controller 10. An anemometer 11 senses wind speed and provides this information to the PID controller 10 via a signal line 16. Blade angle position is transferred from the blade angle sensor 4 to the PID controller 10 via a signal line 12. The PID controller 10 can change the blade angle via a control line 13. The PID controller can change torque of the generator via another control line 15. The rotor hub also includes a connection 5 for another rotor blade.

Wind turbine regulation is didactically discussed below by means of the so-called power-output/rotor-speed characteristic curve shown as a function of wind speed in FIG. 1.

Conventional power-output and rotor speed characteristic curves presently are predominantly applicable to wind turbines and comprise two ranges.

The first range of the power-output or rotor speed characteristic curve is the lower partial-load range LR. This range begins at the so-called wind cut-in speed $v_K$ and terminates at the nominal speed $v_N$. The cut-in speed is the wind speed at which the wind turbine delivers effective power. As regards wind speeds below the cut-in speed $v_K$, the rotor power output merely covers power losses of the drive train and intrinsic needs.

In the lower partial-load range, the power output or the rotor speed increases with wind speed up to where the nominal wind speed $v_N$ is reached. Within this range, the blade angle is kept substantially constant and the rotor speed is regulated, i.e. controlled by the rotor-speed dependent torque. The power output depends on the wind-power collected by the rotor. The rotor-speed characteristic curve within the lower range comprises two segments, a and b, the segment "a" being level along the lower rotor-speed limit $\Omega_u$. Within the second segment "b", the rotor speed rises linearly with the wind speed (operation at optimal tip speed ratio) until the upper rotor-speed limit in the form of the nominal rotor speed has been reached. The nominal rotor speed may be reached at the nominal wind speed, however said nominal rotor speed, most of the time, will be reached earlier.

The nominal wind speed $v_N$ is the wind speed at which the wind turbine's output for the first time corresponds to its so-called nominal output.

The second range of the power-output or the rotor-speed characteristic line is the so-called nominal power output range NR. This nominal power output range begins at the nominal wind speed $v_N$ and terminates at the shutdown speed $v_S$; the regulation of rotor speed by adjusting the blade angle to set a nominal power output takes place within this nominal power output range. The shutdown wind speed $v_S$ is the maximum wind speed at which the wind turbine may be operating when delivering power. Ordinary operation of a wind turbine at which the nominal power output is regulated by adjusting the rotor blade is impossible at wind speeds higher than said shutdown speed because further exposure to mechanical loading would damage, even destroy the wind turbine. In the present state of the art, wind turbines are shut down when the shutdown wind speed is being reached.

In general, the wind turbine output power is fed into public electricity grids. However, abruptly shutting down wind turbines at wind shutoff speeds and especially so where the area contains many such wind turbines, may entail voltage or frequency dips in the public electricity grid. Desirably therefore, wind turbine shutdown should not be abrupt but instead in the form of a slowly reduced power output.

Moreover, besides grid compatibility, slow power reduction also allows continued wind turbine operation in spite of the shutdown speed having been exceeded, without thereby the wind turbine being damaged by increasing wind speeds and their attending increasing stresses.

One procedure whereby the output power and the operational rotor speeds can be regulated at and above the wind shutoff speeds as a function of wind speed illustratively is known from the European patent document EP 0 847 496 B1.

FIG. 2 illustrates an output power or a rotor-speed characteristic curve of the above known procedure, said curves comprising a third range segment as compared with the curves discussed earlier above, namely the upper partial-load range UR. This third segment begins when reaching a limit speed $v_{Lim}$ substantially being the heretofore shutdown wind speed.

It is known from the German patent document DE 198 44 258 A1 to reduce the power output at a predetermined wind speed. However this reduction in power output is carried out at less than the shutdown wind speed.

Both procedures, stated above, of the state of the art share the feature of regulating the power output in the upper partial-load range upon reaching a predetermined limit speed as a function of the measured, increasing wind speed. However the practice of converting the wind turbine regulation in the upper partial-load range as a function of measured wind speed is exceedingly problematical.

Operating a wind turbine in an upper partial-load range involves subjecting the wind turbine to high loads caused by high wind speeds. One reason is that the air flow is not steady-state but turbulent. Turbulence implies that the speed at which the wind impinges the rotor surface is not uniform on said surface, instead the incident wind power is distributed unevenly. In other words, exceedingly high wind forces may be applied at one or more rotor zones. At the same time one or more other rotor zones may be little wind-loaded or not at all, whereby at high turbulence the wind turbine may be subjected to very high changing loads and be damaged by them at once or in the long term. At high wind speeds, the applied changing loads will be especially high.

Accordingly, the just above described changing loads due to turbulence should also be taken into account in power-output or rotor-speed regulation in the upper partial-load range.

As a result, as regards the known procedures, it is mandatory that the measured wind speed basic to their regulation shall properly reflect the actual wind conditions. Heretofore, however, no practical procedure has been available to reliably determine such basic wind speed conditions.

It is known to measure wind speed using a nacelle anemometer. This procedure however incurs a well known lack of accuracy, the wind turbine rotor interferes much with the measurement. Rotor effects are felt at least one rotor diameter in front of and three rotor diameters behind the rotor. Accordingly, clean-cut measurement is impossible. Moreover this procedure allows only measuring wind conditions in one spot of the wind zone. This known procedure is unable to transduce the turbulent wind speeds across the entire rotor.

Several publications, for instance WO 2004077068 A1 or German patent document 101 37 272 A1 disclose 3D measurements of wind conditions in front of the wind turbine using so-called LIDAR or SODAR systems. Such measurements are stated as being applicable in particular to wind farms.

To-date, for lack of sufficient testing, said systems have been put to practice only in isolated cases. Moreover, these LIDAR and SODAR systems are very expensive and it appears that economically not every wind turbine can afford to have one, hence these systems appear impractical when actual wind conditions must be ascertained.

Also the European patent document EP 1 230 479 B1 discloses a procedure using sensors configured in the rotor blades to detect their mechanical loads, the test values also being available for wind turbine regulation for instance. FIG. 2 of said document shows a schematic of power output as a function of wind speed and FIG. 3 shows a schematic of the tested blade loads also as a function of wind speed.

As shown by FIGS. 2 and 3 of said European patent document 1 230 479, the blade load is flat in the wind speed range where, according to FIG. 2, the power reduction should have begun. Therefore the mechanical loading of the rotor blades on the average remain substantially constant due to adjustment of the blade angle and the related reduction of the blades' wind-loaded surfaces. Consequently, blade loading may not be used as a drive parameter to regulate the power-output or rotor-speed characteristic curve in the upper partial-load range because such regulation operates only upon a clear change of the mean blade load, this condition being absent from FIG. 3. Indeed short-term load peaks may be used to regulate the rotor for instance to preclude collision between the rotor blade tips and the tower. However wind turbine or rotor-speed regulation by means of load peaks is not advantageous because grid compatibility and large mechanical rotor inertia of the wind turbine entail respectively slow changes in power output and in rotor speed enduring well after said peaks have decayed.

Accordingly, the procedure recited just above merely offers a way of detecting the mechanical loading of the rotor blades in said upper partial-load range and to take into account said detected data in the regulation of this range. However, the patent document cited just above does not disclose using such detected load values, and accordingly regulation in the upper partial-load range discussed in the European patent document EP 1 230 479 can only be carried out as a function of wind speed.

Summarizing the above cited procedures of the state of the art, it has been known heretofore to regulate the power-output or the rotor speed in the upper partial-load range as a function of wind speed. However, absent high costs, heretofore it has been impossible to detect a wind speed that would represent the actual wind conditions and therefore said above discussed previous procedures incur the substantive drawback that they make practical implementation difficult.

The known state of the art has failed so far to discover a method, in particular applicable to a multi-megawatt wind turbine, allowing operation in a power-output reducing manner in a wind speed range illustrative between 25 and 35 m/s or 25 and 40 m/s, and reliably excluding load increases on the wind turbine(s). The regulation algorithms of the known state of the art moreover are highly susceptible to interference especially for high wind speeds where fluctuations in such wind speeds are related to large fluctuations of incident wind power. For that reason the above cited procedures indeed have hardly been used practically.

Accordingly, the reduction in power output or in rotor speed should not be based on measured wind speed, but instead on an input variable which on one hand is easier to detect physically and by control technology and which on the other hand represents a better wind turbine stress signal.

BRIEF SUMMARY OF THE INVENTION

The object of the present invention is to create an improved and more reliable method of regulating a wind turbine in the range starting at a defined limit value and to offer improved grid compatibility.

In the proposed method of the present invention to regulate a wind turbine, the rotor is operated at a substantially constant nominal rotor speed in a nominal power-output range following a lower partial-load range until reaching a defined limit value. When exceeding the limit value, the rotor is operated in the upper partial-load range by reducing the rotor speed below the nominal power-output rotor speed.

The term "nominal rotor speed" denotes that rotor speed at which the wind turbine reaches its nominal power output at the nominal wind speed. On the other hand, the term "nominal power-output rotor speed" denotes a rotor speed at which the wind turbine is able to deliver nominal power output. The nominal power output rotor speed is not necessarily identical with the nominal rotor speed, but may be of a magnitude near it. Usually but not always, this vicinity amounts to, but is not restricted to +/−10% approximately.

In the present invention, at or beyond reaching the limit value, the rotor's speed shall be adjusted as a function of the rotor blade angle.

The present invention offers the advantage that, following exceeding a limit value, the input variable used to regulate the rotor speed consists not of the measured wind speed as is the case in the prior art—such measurements as already explained above being subjected to considerable difficulties—but instead the present invention uses the rotor blade angle, which can be ascertained in simple manner. In the method of the present invention, the generator speed may be used in a fully equivalent manner in lieu of the rotor speed.

Further, the present invention is based on the insight that the adjusted rotor blade angle offers substantially better information about the wind turbine load conditions than does the measured wind speed. This feature arises from the fact that a blade angle is adjusted as a function of the rotor output power and of the rotor speed, as a result of which not only shall the wind speed be taken into account, but also further factors such as the instantaneous wind direction, air density, the vertical and horizontal wind gradients, the wind turbulence, the wind turbine's dynamics, etc.

Accordingly, an adjusted rotor blade angle mirrors the wind power absorbed by the rotor and integrated over its full surface, whereas the anemometer-measured wind speed merely mirrors power applied at a spot of the wind region near said anemometer.

As a result, and contrary to long held expert opinion, the complex physical relations involved preclude unambiguous relationship between a measured wind speed and the rotor blade angle. This fact was corroborated by measurement.

FIG. 4 is referred to clarify the statements above. FIG. 4 is a schematic of a large number of rotor blade angles as a function of wind speeds such as are measured in standard operation of a wind turbine impacted by turbulent wind.

As shown by FIG. 4, both a wind speed of 13 m/s and of 26 m/s may be assigned to one blade angle for instance of 15 deg, or to any speed value inbetween. Besides the above cited factors, the large dispersion of the test values also may be due to wind turbine regulation involving pronounced dynamic processes of great significance to the instantaneous stresses.

Accordingly, FIG. 4 corroborates the absence of an unambiguous relationship between wind speed and blade angle, instead it shows some relation, itself of poor correlation, namely being inadequate for accurate regulation required by the power output of a large wind turbine in the upper partial-load range.

As a result, and as shown in FIG. 4, the blade angle constitutes a significantly better input parameter than wind speed because being a parameter of which the value can be determined in a simple manner whereas the wind speed may be subject to considerable fluctuations across the rotor surface.

The purpose of wind turbine regulation in the upper partial-load range being to enable wind turbine operation also at high wind speeds without jeopardizing the wind turbine by overstressing it, the above cited parameters such as wind direction, wind turbulence etc. must mandatorily be taken into account. This account-taking is made possible in an amazingly simple manner in the present invention by blade-angle dependent regulation in the upper partial-load range.

Assuredly a number of the above deleterious factors may be eliminated by averaging wind speed over a sufficiently long time. As comprehensively shown further below, averaging over a 15 second time interval however reduces the fluctuations only insignificantly, while averaging times of several minutes for instance required to attain a halfway acceptable correlation would merely render such regulation undesirably sluggish.

Such factors as the air density effect entail seasonal fluctuations. For instance it is known that between winter and summer considerable air density fluctuations may arise at operational sites undergoing large temperature fluctuations and that said density fluctuations directly affect the stresses on the wind turbine. This effect is fully taken into account by a blade-angle dependent reduction in output power. Moreover the present invention averts the known error-ridden matching of the pertinent regulation parameters to the altitude-dependent, mean height of operation that is required for instance in mountainous regions.

In order to still better detect the above cited effects, the blade angle of modern wind turbines frequently is regulated not only as a function of rotor power output and rotor speed, i.e. physical variables which more broadly considered, constitute the integration of the wind power integrated over the full rotor surface, but the blade angle also may be regulated as a function of the measured or computed (estimated) loads.

The method of the present invention provides permanent monitoring of the rotor blade angle. Below said limit value, the operations control computer regulates the rotor speed in a manner such that optimal power input is attained, that is, the rotor is operated at the most advantageous setpoint rotor speed of the operating range. Maintaining the setpoint rotor speed is implemented conventionally by a combination of blade adjustment and generator torque or output-power regulation and is adequately described in the state of the art. At the limit value and beyond, a predetermined setpoint procedure will lower the setpoint rotor speed as a function of the rotor blade angle, in other words, the nominal power-output rotor speed is abandoned. As regards the heretofore described rotor-speed regulation, it consists always of the input of a setpoint rotor speed value illustratively being used as the regulation input for blade adjustment. However gusts or negative gusts entail—as in typical operation below the limit value—again dynamic fluctuations about the setpoint rotor speed, said fluctuations then entailing correction by means of dynamically adjusting the blade angle and possibly the generator torque.

Continued rotor speed regulation is carried out conventionally as in the wind turbine operation in the nominal power-output range essentially by adjusting the blade angle; that is the blade angle is changed depending on the rotor-speed deviation (setpoint rotor speed minus the actual rotor speed) in order to maintain the setpoint rotor speed. Accordingly, a conventional control circuit with simple signal feedback is used.

When operating in the upper partial-load range, rotor speed regulation in the present invention also is carried out by blade angle adjustment. In addition, however, the setpoint rotor speed is controlled as a function of the blade angle, that is, not only is the blade angle changed as a function of the rotor-speed deviation, but also any change in blade angle simultaneously entails a change in the rotor-speed deviation (by changing the setpoint rotor speed). Because the rotor-speed deviation is used to regulate the blade angle, the change in the setpoint rotor speed also entails a subsequent change in the blade angle. In a figure of speech, the change in the setpoint rotor speed corresponds to a change in the regulation goal. To this extent, double signal feedback is involved. Prototype simulations and measurements indicate that this regulation loop can be operated in a stable manner and will function in a problem-free manner when the parameters are selected appropriately.

Rotor speed reduction is implemented by means of a reference function (rotor speed vs. blade angle) for instance in tabular form or a mathematical function derived from a consideration of the aerodynamic rotor conditions and loads. To attain optimal results, the reference function must be iteratively determined for each blade model and for each wind turbine model, either by computer-simulation operations or by field tests (which would be time-consuming).

Accordingly, an especially advantageous mode of implementation of the present invention provides that the reference function of rotor speed and blade angle shall be ascertained and/or optimized by simulation computations taking into account the loads on wind turbines under turbulent wind conditions.

One method of the present invention to derive or optimize the rotor-speed/blade-angle characteristic curve of the inventive regulation of a wind turbine in this respect investigates the regulation behavior especially by means of turbulent-wind time series containing positive jumps in wind speeds, illustratively the mean wind speed of 26 m/s abruptly rising to 35 m/s. In such cases there is an especially high risk of overstressing the wind turbine.

If in the process, the stresses/loads should exceed the permissible values, then the rotor-speed/blade-angle characteristic curve, the regulation parameters and/or the regulation algorithm will have to be changed. Alternatively, of course, the proof can be presented that all wind turbine components can withstand the increased loads.

Simulation calculations for a 5 Mw wind turbine showed that the rotor speed in the vicinity of the limit value must be reduced fairly quickly in order to keep the stresses in the permissible range. To prevent the output power from also dropping rapidly, the generator torque must be raised compared to the known rotor-speed behavior of the lower partial-load range. Though this technique initially is more complex, on the other hand it offers the advantage that in the end regulation can be such that loads cannot be higher than they are when the wind turbine is shutdown as the limit value is reached, i.e. said loads are better limited by the regulation of the present invention whereby for instance the operating reliability of the wind turbine can be raised and still a desirable slow drop in power output can be attained to meet grid compatibility requirements.

As known from the state of the art, the limit value may be in the form of a defined wind shutoff speed. However, and as already comprehensively discussed above about the state of the art, ascertaining the actually prevailing shutdown wind speed presents a serious problem.

In one advantageous embodiment mode of the present invention, a defined rotor blade limit angle may be used as the limit value in the manner illustratively defined in the German patent document 103 00 733 B3.

In another advantageous embodiment of the present invention, the rotor blade angle is constituted as a time average of several rotor blade angles, quality of regulation being much improved by appropriately selecting the averaging time. Optimal averaging time depends on the power distribution of the turbulent wind and ought to be preferably between 2 and 120 s, especially advantageously between 10 and 60 seconds at the typical European operational sites.

A 15 second moving average was found especially advantageous in a multi-megawatt wind turbine with a power output of 5 Mw, both as regards the desired stability of regulation and preserving the admissible loads on the wind turbine. This moving average may be approximated by an internal control by a $PT_1$ link with a time constant of about 7.7 seconds to optimize the regulation algorithm.

Because the rotor blades of modern wind turbines may be adjusted individually, the blade angle needs being averaged both temporally and spatially, that is, an average of the individual rotor blade angles also is being formed. The invention employs not only arithmetic averages, but any other mathematical averages such as geometric averages both for time and spatial averages.

The procedure disclosed in said European patent document EP 1 230 479 to regulate the blade(s) using measured loads and also regulation by means of so-called load estimators leads jointly with the method of the present invention to especially advantageous synergy. Here the expression "wind turbine loading" covers both stresses and deformation.

In a further advantageous embodiment of the present invention, the generator torque of the generator housed in the wind turbine may be adjusted above the limit blade-angle as a function of rotor speed, and according to another advantageous embodiment of the present invention the generator torque can be reduced as the rotor speed decreases.

Known wind turbines include a converter designed in a manner that the wind turbine may be operated in variable rotor-speed manner. If the rotor (i.e. the generator) speed is lowered, said converter, in general, is unable to maintain the generator torque at the magnitude of nominal torque. Depending on the design of the converter, the generator torque also must be lowered as a function of rotor speed. Again, this feature may be implemented by access to a tabular function or to a mathematical function already conventional for the lower partial-load operation in the zone of optimal high speed operation.

It is clear per se in that respect to use the mathematical formulation conventional for the partial-load range and frequently being a tabular function, the so-called "look-up table" and stored in the control system.

The rotor-speed characteristic curve required to deal with loading, however, in conjunction with the partial-load torque characteristic curve would entail excessive reduction of power output in the zone of limit blade angle. Accordingly, attaining gentle and even reduction in power output demands that the generator torque be adjusted at values which are higher than those known in the lower partial-load range.

In an especially advantageous embodiment of the present invention, the generator torque also is adjusted in relation to the blade angle.

In an especially simple manner in that respect, regulation above the rotor blade limit angle is based on the function defined for the partial-load range, for instance a table or a mathematical relation, said regulation however being adapted based on the rotor blade angle by means of a correction value so that the desired gentle and even reduction in power output shall be implemented.

Applying the correction torques offers the advantage that both partial-load ranges are based on a universal regulating means. Because the blade angles in the lower partial-load range always are near 0 deg, the blade-angle dependent correction will not be applied there. The table below illustrates correcting the torque of a 5 Mw wind turbine having a nominal rotor speed of 1,170 rpm and a nominal torque of about 44,900 Nm.

TABLE 1

Preset rotor speed for the torque of a 5 Mw wind turbine

|  | Rotor blade angle (deg) | | | | | | |
| --- | --- | --- | --- | --- | --- | --- | --- |
|  | 23 | 25 | 30 | 30.5 | 33 | 40 | 50 |
| Upper reference rotor-speed limit (rpm) | 1,180 | 1,160 | 1,060 | 1,050 | 1,000 | 880 | 760 |
| Correction torque (Nm) | 0 | 0 | 15,000 | 14,500 | 10,000 | 5,000 | 5,000 |

As shown by the table, torque correction is absent until the rotor blade limit angle—here 25 deg—is reached. When exceeding the rotor blade limit angle, for instance starting at a rotor blade angle of 30 deg, there shall be a corresponding adaptation by means of the torque correction values.

The table's second row shows the blade-angle dependent rotor-speed default which is implemented in the form of an upper limit on the setpoint rotor speed. It was found to be highly advantageous to make the action of the rotor speed limiter especially gentle by means of a blade angle of 23 deg being associated with a rotor speed limit which is just above the nominal rotor speed of the illustrative wind turbine. Interpolation is carried out between the nodes, in the simplest case linearly but preferably with a higher order interpolation. Interpolation obviously can be carried out at all tabular values.

In a very advantageous manner, the data of the above table are fed to the control means as relative values instead of the absolute values shown, the behavior then being transferable substantially to wind turbines of different sizes.

Where more advanced control systems are used, the generator torque frequently is regulated dynamically, the rotor's speed being used as the input signal for instance of a PID control. The optimal rotor-speed characteristic curve required in the lower partial-load range frequently is implemented by limitations on the PID or PI control. In this instance too the regulation of the present invention provides control limitation depending on the blade angle in order to attain the desired torque behavior.

Depending on the available regulated variables, another advantageous embodiment of the present invention also allows advantageously adjusting—instead of the generator torque—the power output as a function of the rotor speed, and another advantageous embodiment of the present invention allows reducing said power output as the rotor speed decreases.

As already mentioned above in relation to the state of the art, the control algorithms of the state of the art regulate as a function of wind speed and are susceptible to the effects of vibrations especially at high wind speeds. Accordingly another advantageous embodiment of the present invention provides that—above the rotor blade limit angle—the regulation algorithms shall be changed in such manner relative to standard wind turbine operation by means of blade angle dependent adaptation that the regulation stability shall be maintained in the upper partial-load range.

Said adaptation is based on the insight that the requirements on the control means change at high wind speeds. In the instance of an admissible extreme gust (according to guidelines) with an attendant admissible increase in wind speed of 9 m/s, the same absolute change in wind speed is accompanied by a change in power larger by 24% when taking place at an average wind of 32 m/s compared to 25 m/s. These enlarged fluctuations in applied power illustratively entail higher fluctuations in rotor speed at an equal change in blade angle than would be experienced in ordinary operation. If these enlarged fluctuations in rotor speed were countered with a change in blade angle as large as under nominal power operation, such excess reaction would cause vibrations in the wind turbine. It has long been known furthermore that as the blade angle increases, the dependence of the change in rotor torque on the change in blade angle (sensitivity) will increase. Both effects reinforce each other and entail the requirement to reduce the pitch enlargement in blade-angle dependent manner more than would be the case under normal operation.

Consequently, a further advantageous embodiment of the present invention calls for reducing the so-called change in pitch at blade angles larger than 30 deg to less than 20% of nominal enlargement, that is the pitch enlargement under nominal wind conditions. Pitch enlargement is a control parameter scaling the dependence of the blade change to be carried out on the instantaneous deviation in rotor speed. Where simple proportional control is involved, this will be the proportionality factor between control deviation and setpoint change, namely, in practical terms relating to rotor speed control by means of blade-angle adjustment, the latter shall be calculated by multiplying the rotor-speed deviation by the pitch enlargement. (Actually the relationships are somewhat more complex, because PID control is used instead of P control, however the enlargements of the integral and differential portion are scaled by the pitch enlargement).

The present invention proposes that pitch enlargement at high blade angles be less than one-fifth of pitch enlargement at nominal wind, simulation calculations having shown that the cited control instabilities such as vibrations may be eliminated thereby.

In view of the above discussion it is advantageous as regards the site of operation and the wind turbine to reduce or enlarge by blade-angle control also other control parameters besides pitch enlargement, for instance admissible limit values for the admissible range of rotor speeds.

The present invention also relates to a wind turbine fitted with a rotor blade configured on the rotor at an angle adjustable relative to it.

The present invention is elucidated below in relation to several drawings.

DETAILED DESCRIPTION OF THE INVENTION

Figure 1:
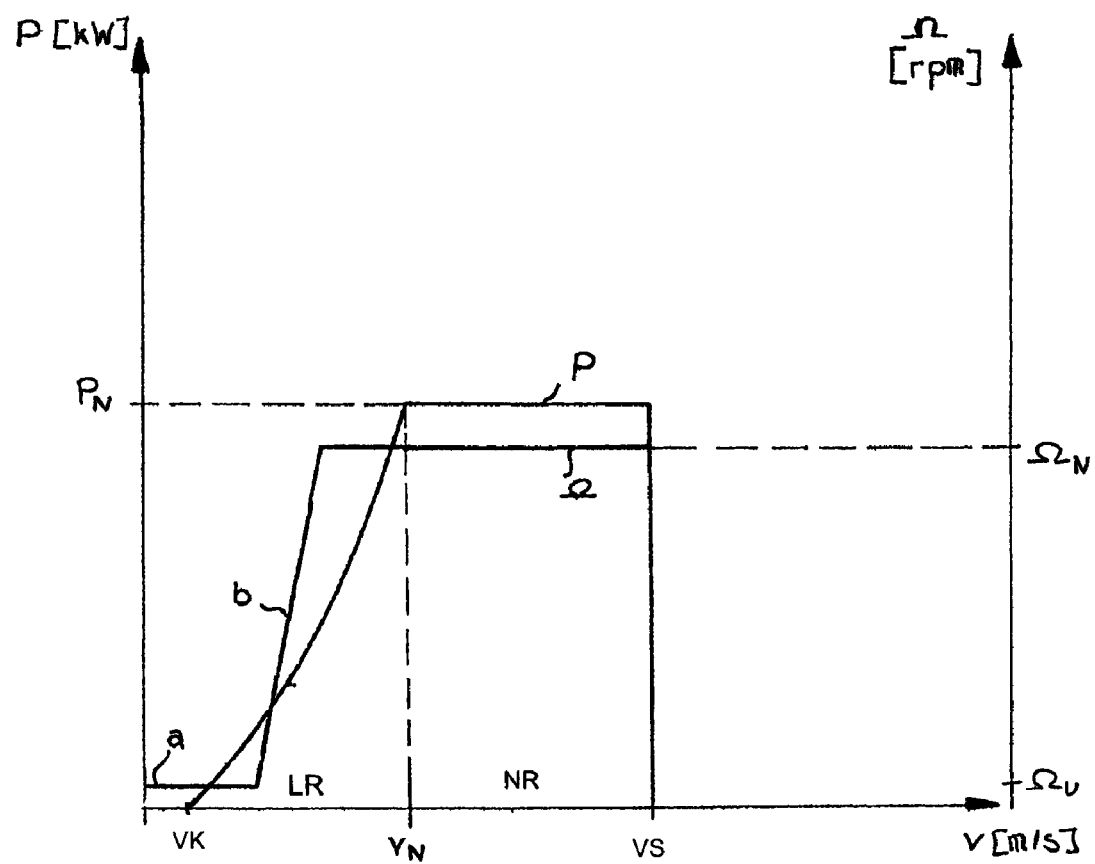
FIG. 1 is a schematic of the characteristic curves of power output and rotor speed and comprises a lower partial-load range LR and a nominal power output range NR.

FIG. 1 already was discussed above in relation to the state of the art and need not be elucidated again here.

Figure 2:
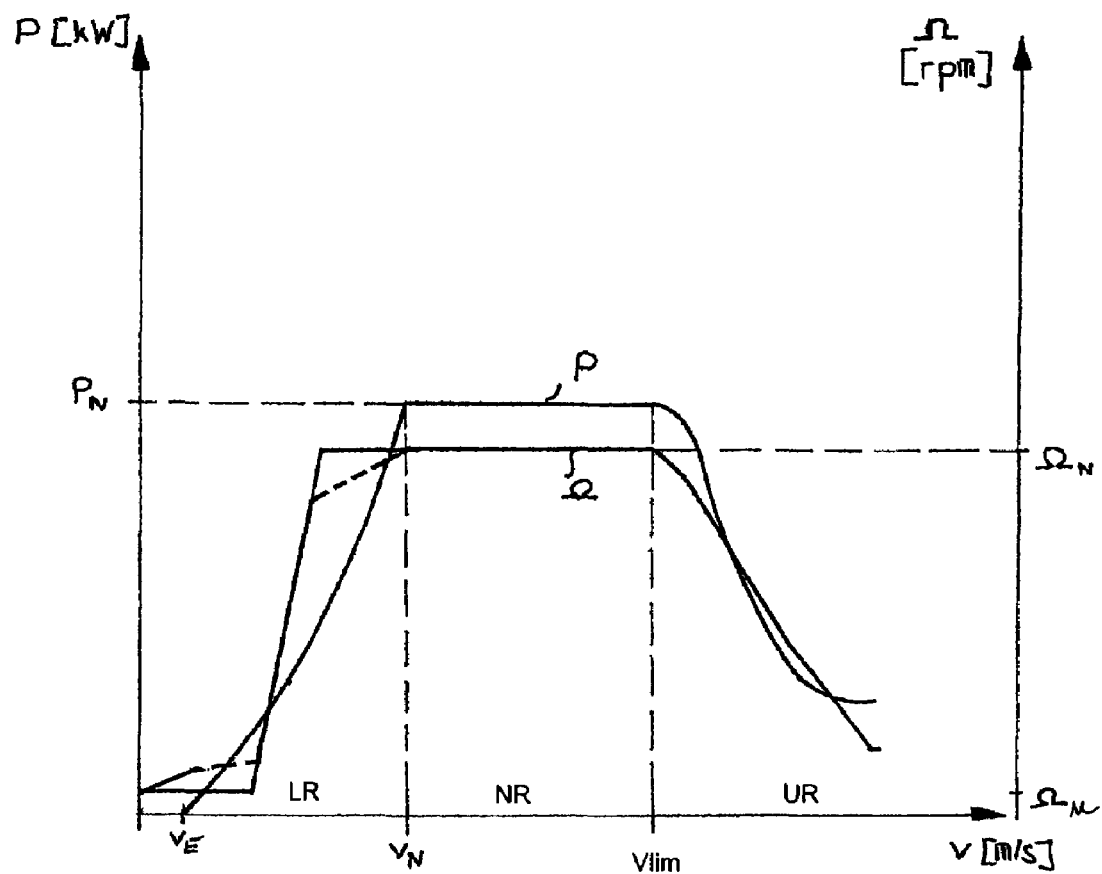
FIG. 2 is a schematic of power-output and rotor-speed characteristic curves comprising a lower partial-load range LR, a nominal power output range NR and an upper partial-load range UR.

FIG. 2 also was discussed above in relation to the state of the art and needs only a few more comments below.

In its lower partial-load range LR, FIG. 2 shows in solid lines a rotor-speed characteristic curve such as would attain optimal power output in a limited and predetermined rotor-speed range between $\Omega_u$ and $\Omega_N$. Conventionally, regulation is implemented by a PI or a PID control acting on the generator torque as a function of rotor speed to attain the rotor-speed ramp for operation at an optimal high operating rate. Alternatively and as already mentioned above, to attain an especially simple control algorithm, a simple relation between rotor speed and torque, for instance a tabular function, may be defined. Illustratively such a fixed rotor-speed/torque characteristic curve would lead to the dashed rotor-speed characteristic curve. The horizontal plateaus must be replaced by flat ramps. The steep ramp at the very beginning of the rotor-speed characteristic curve illustratively is used to avert resonance in the tower and in the shown embodiment is situated below the cut-in speed $v_K$. However such a steep ramp may indeed also be present in normal operation.

Because power may be derived from physical equations as the product of rotor speed and torque, FIG. 2 already indicates that the rotor-speed/torque relation applicable in the lower partial-load range LR must be modified in the upper partial-load range UR because in the latter, higher power is generated at the same rotor speed. This latter relation will be elucidated in the discussion of FIG. 8.

Figure 3:
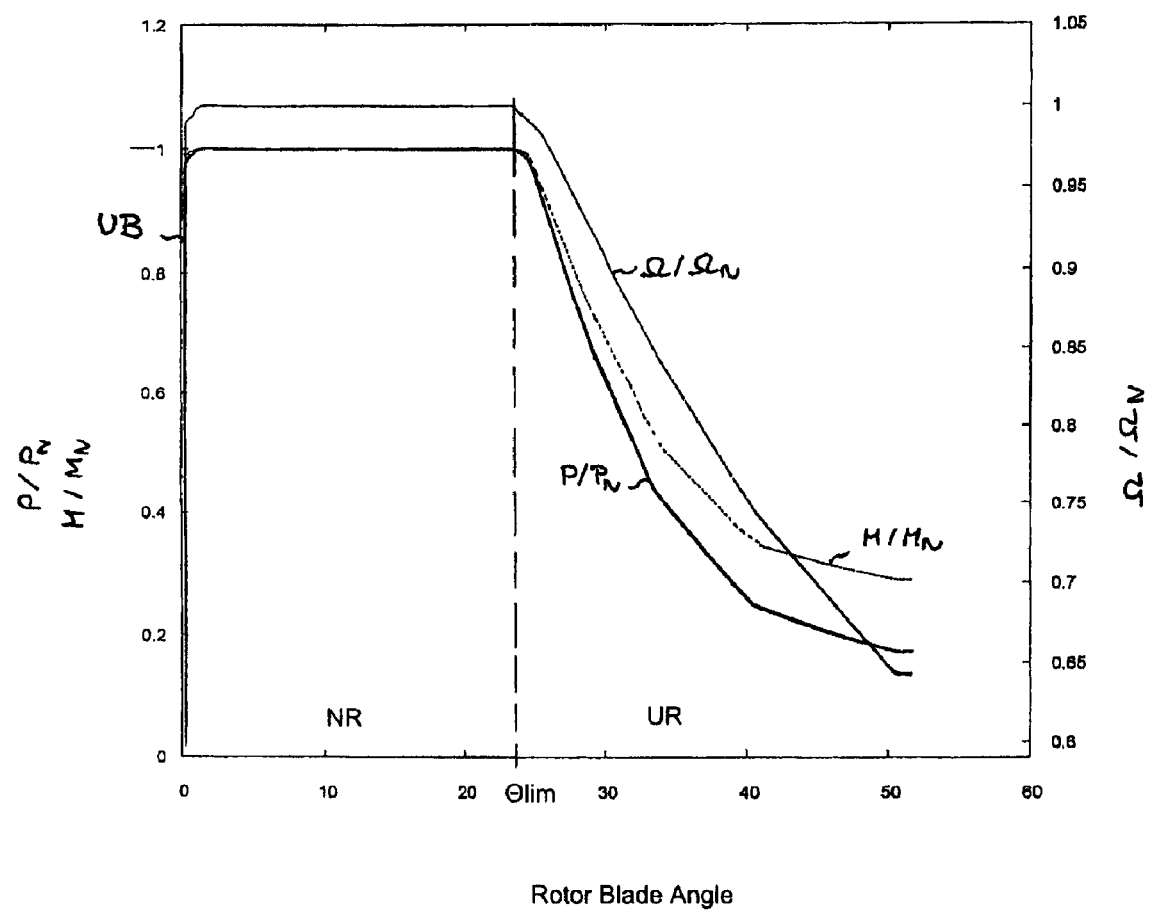
FIG. 3 is a schematic of power output, torque and rotor-speed characteristic curve as a function of rotor blade angle.

FIG. 3 shows a power output characteristic curve, a rotor speed characteristic curve and a torque characteristic curve, all depending on the rotor blade angle θ. As already discussed in relation to the state of the art, the rotor blade angle is kept substantially constant in the lower partial-load range and is nearly 0 deg. The nominal power output range NR begins at the nominal power and the rotor blade angle is changed in a manner that the wind turbine is operated at nominal power output, nominal torque and nominal power output rotor speed. When a rotor blade limit angle $θ_{lim}$ is reached, the rotor speed Ω, further the torque M and hence the power output P are each gently reduced, and in the process, according to the invention, the rotor speed and torque or power output are preset by the blade angle enlargement. The rotor speed, torque and power output are shown in relative form and thereby may be stored as such in a control unit table.

Figure 4:
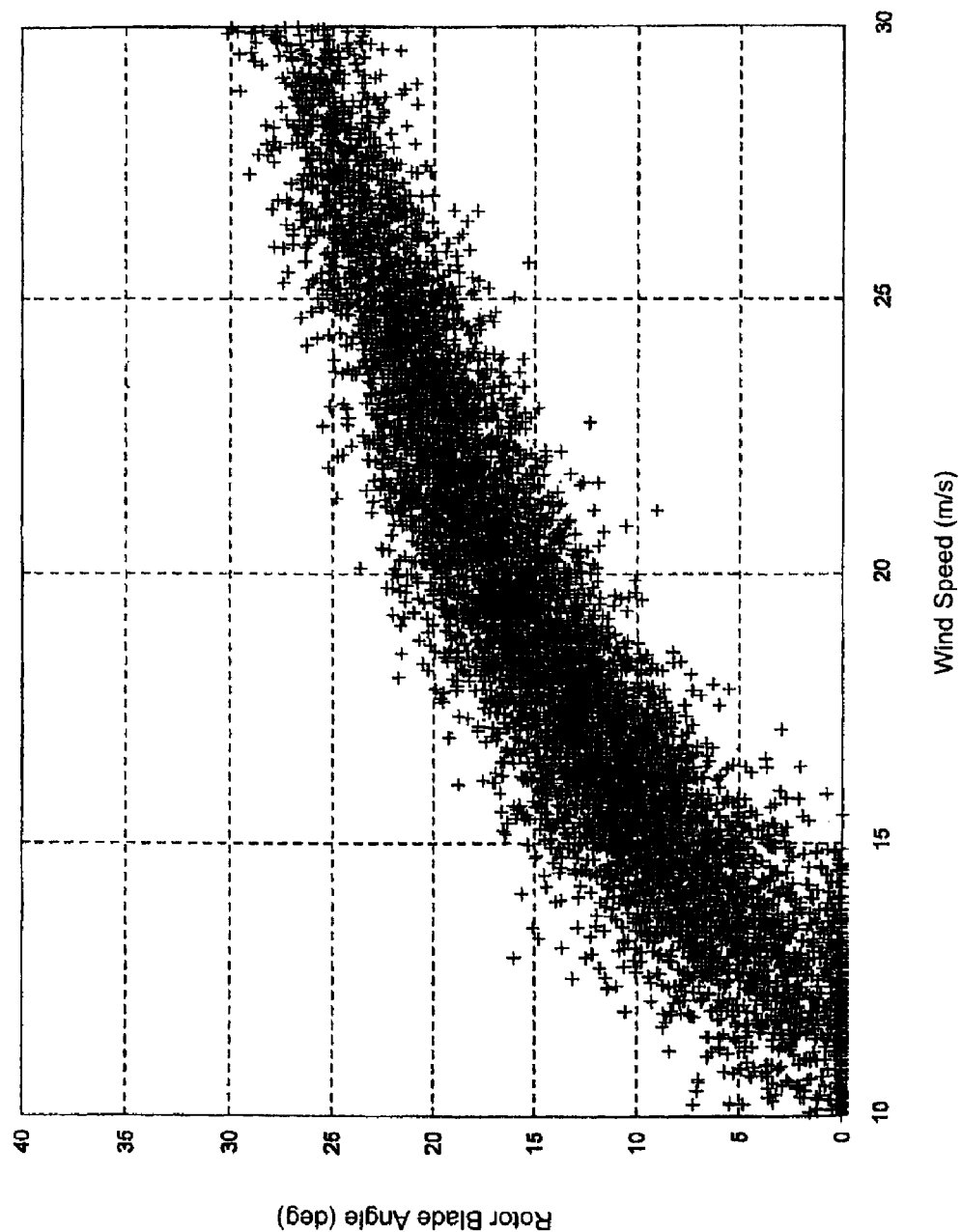
FIG. 4 is a plot of recorded rotor blade angles as a function of wind speed.

FIG. 4 already was described in the discussion of the advantages of the invention and therefore shall not be discussed here again.

Figure 5:
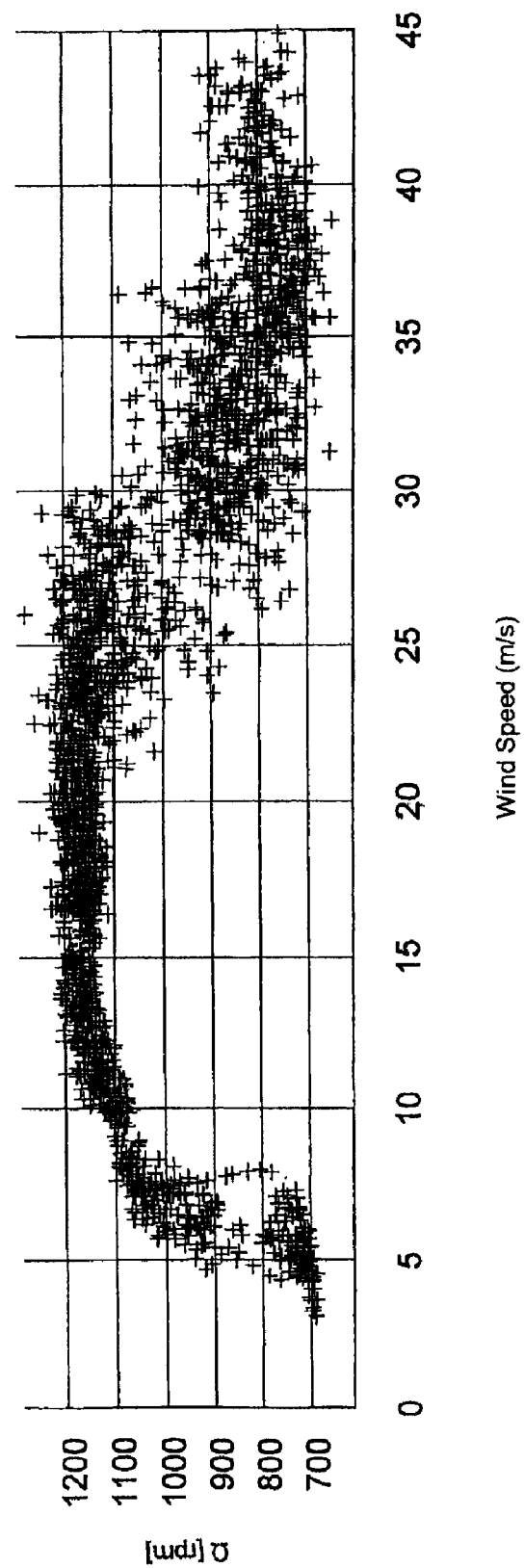
FIG. 5 is a plot of simulated test data of generator rotor speed as a function of rotor blade angle and of wind speed.

FIG. 5 is a plot of a large number of recorded generator speeds Ω determined by simulation calculations for a 5 Mw wind turbine as a function of wind speed. The algorithm determining the preset rotor speed operating with the 15 s moving average of the blade angle, the plot of FIG. 5 also was subjected to a 15 s moving average to provide appropriate comparison.

Plotting the rotor speed as a function of wind speed graphically shows that the rotor speed and hence also the power output are reduced not depending on the wind speed, but instead on the rotor blade angle which, as already shown in FIG. 4, is very ambiguously related to wind speed.

FIG. 5 shows that in the regulation method of the invention, in spite of a 15 second averaging, a wind speed between 23 m/s and 44 m/s is associated with an rotor speed for instance of 900 rpm and inversely that a rotor speed of 680 to 1,070 rpm—that is the preponderant portion of the full rotor-speed range of the illustratively 5 Mw wind turbine, which is between 650 and 1,260 rpm—is associated with a wind speed for instance of 33 m/s.

Simulation calculations have shown it is precisely the abandonment of the state of the art's dependence on wind speed and the invention's introduction of blade angle as the regulating input to attain reduction in rotor speed and power output that not only shall improve regulation, but, as described above, make it rationally possible at all. "Rational" here means that assuredly the power output also may be reduced as a function of wind speed, but if such a procedure is employed, then controlling the ensuing instabilities in regulation and additional stresses would make it uneconomical.

Figure 6:
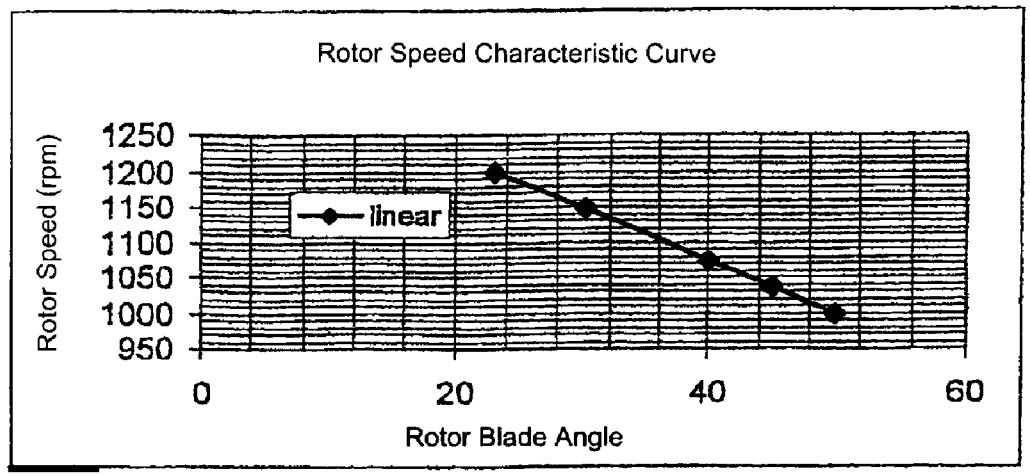
FIG. 6 is a characteristic curve of rotor speed vs blade angle of a wind turbine.

FIG. 6 shows an illustrative function of rotor speed vs. blade angle for a wind turbine of which the nominal rotor speed is 1,170 rpm. In the present instance, reduction of rotor speed should start at a rotor-speed limit angle of about 24 deg. A rotor speed of about 1,000 rpm is attained at about 50 deg. In the present illustration the characteristic curve is assumed linear. Depending on loading or desired grid behavior, it will be practically advantageous also to use non-linear as well as progressively and decreasingly scaled characteristic curves.

Figure 7:
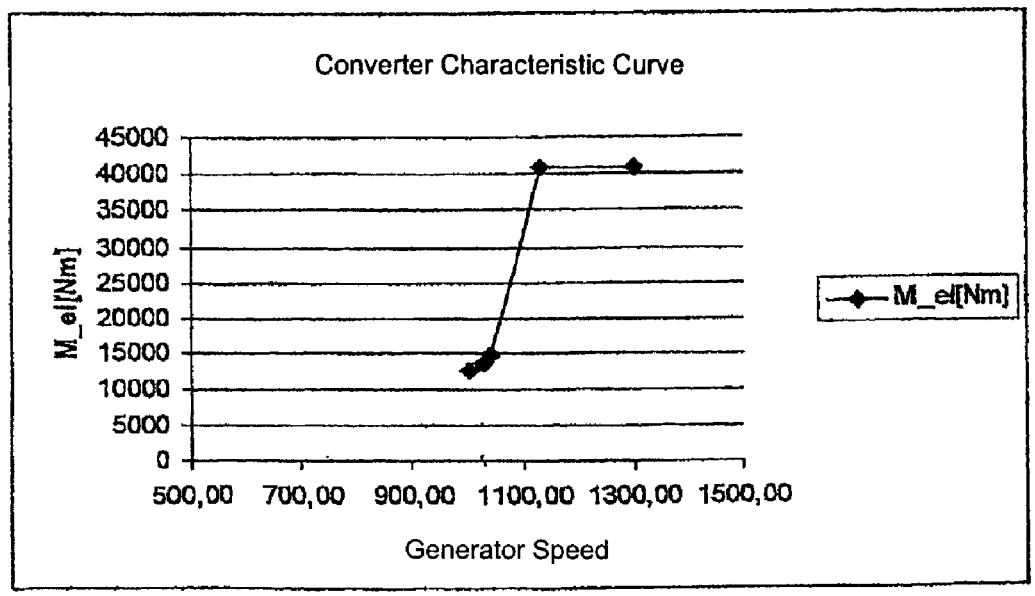
FIG. 7 is a plot of a converter characteristic curve.

FIG. 7 illustrates the converter characteristic curve. It plots the generator torque vs. the generator rotor speed. If the power yield in power-reducing operation shall be maximized, the shown characteristic curve shall be followed as tightly as possible. If the foremost objective is to reduce transmission loads (for instance gear torques), it may be advantageous to significantly drop below the characteristic curve, obviously less power being fed into the grid. Exceeding the converter characteristic curve is possible only short term in order to not to jeopardize this converter.

Figure 8:
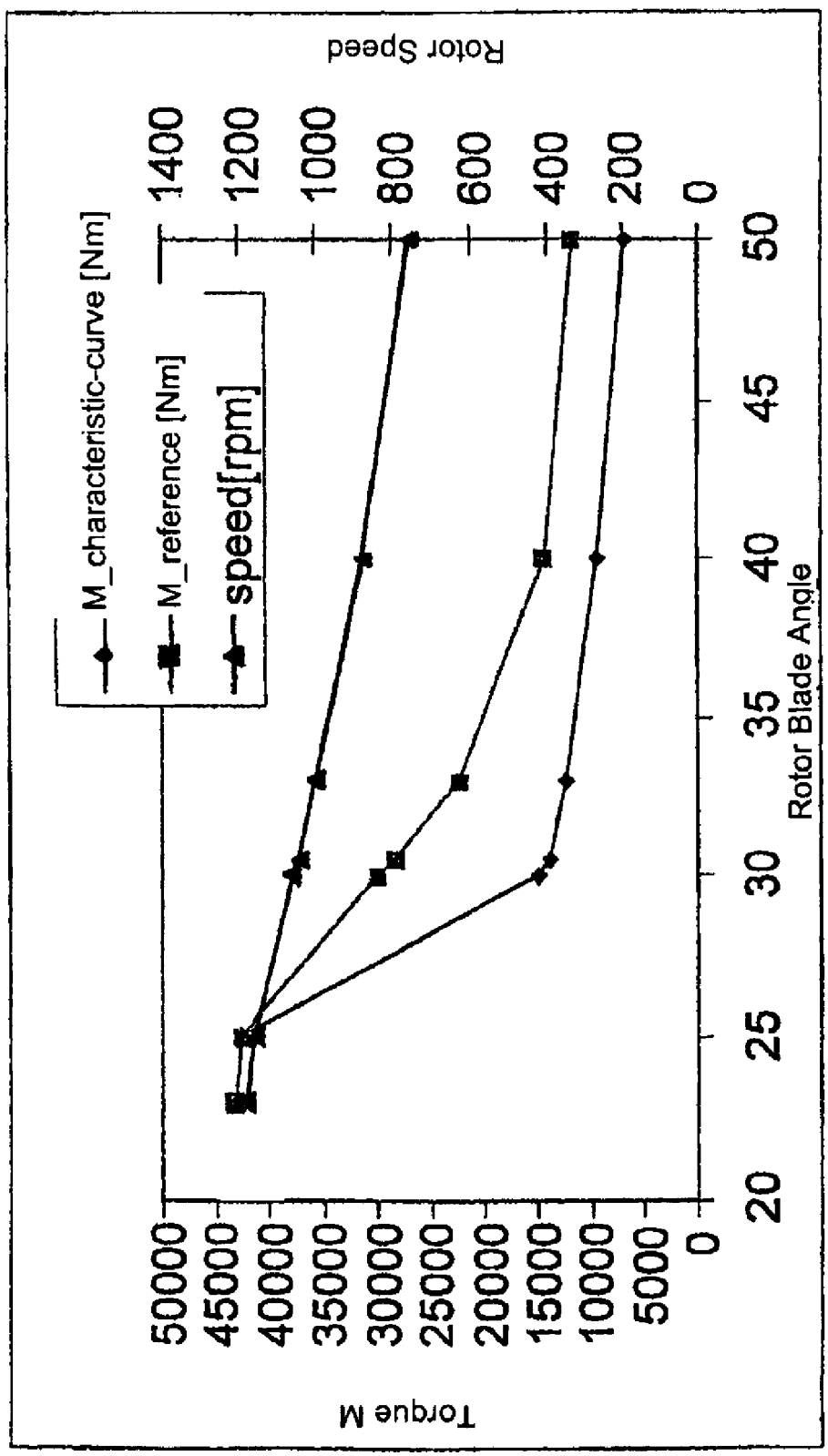
FIG. 8 is a plot of recorded torque/rotor-speed vs. rotor blade angle.
Figure 9:
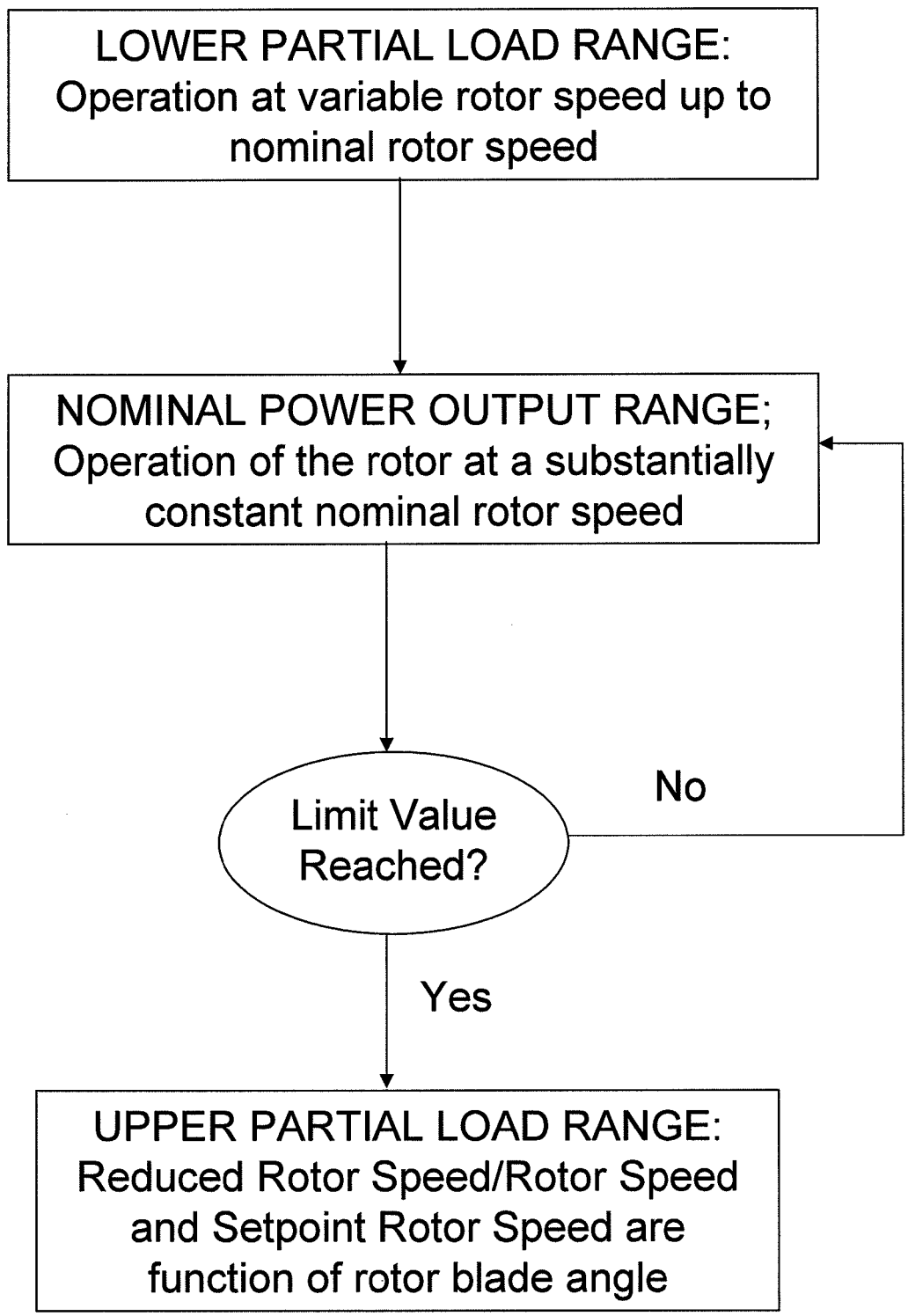
FIG. 9 is a schematic representation of the steps of a method of the invention.
Figure 10:
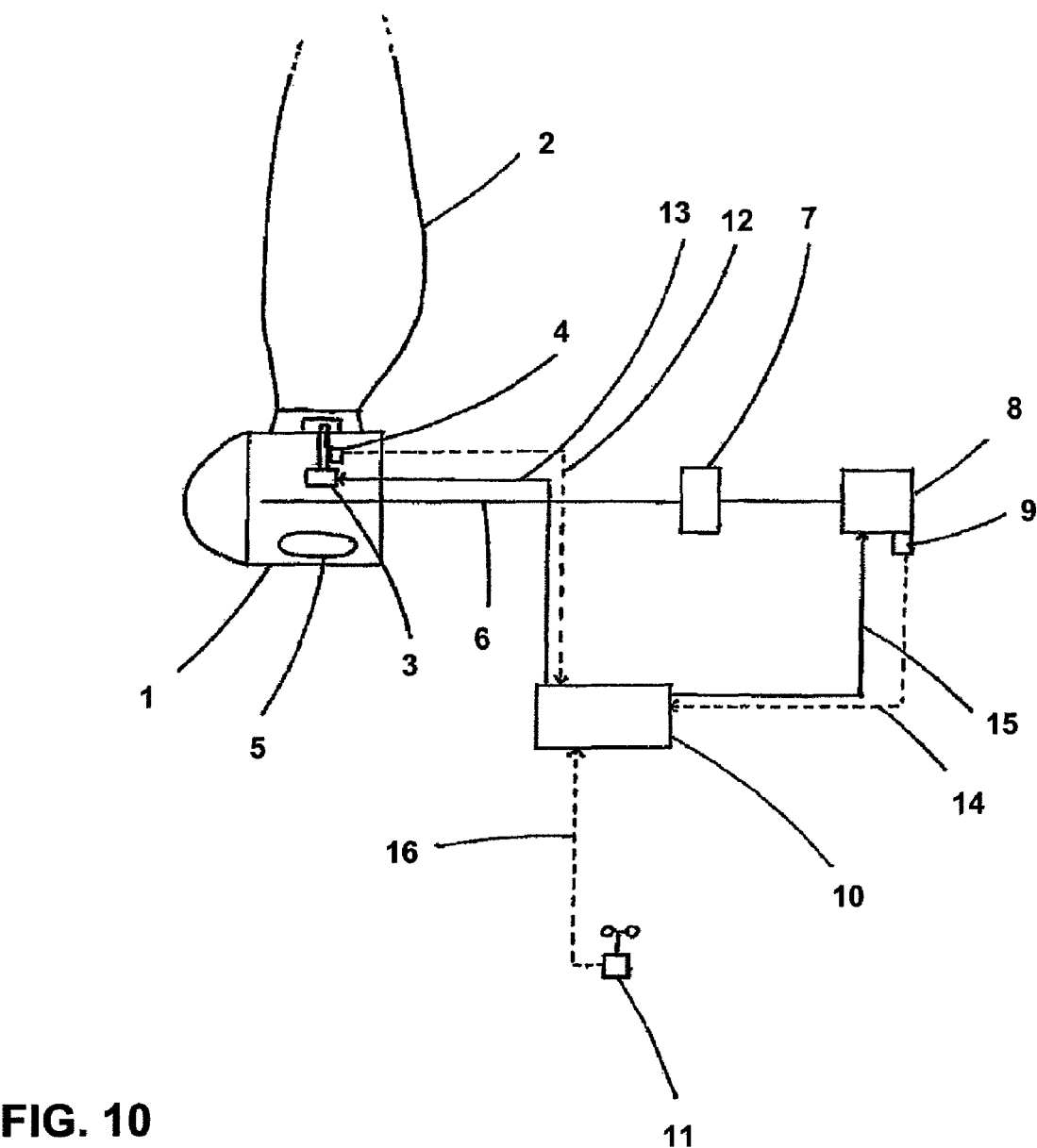
FIG. 10 is a schematic representation of a common wind turbine and control system.

FIG. 8 shows the plot of generator rotor speed and generator torques as a function of the blade angle using the values listed in Table 1. The M_characteristic curve denotes the rotor-speed/torque dependency used in the lower partial-load range plotted against the blade angle; the M_reference denotes the preset reference value of the regulation method of the invention with blade-dependent torque correction. The torque correction values listed in Table 1 are shown in the form of the deviation subtended between the M_characteristic curve and M_reference.

The invention claimed is:

1. A method, utilizing feedback control with a feedback loop, with which to regulate a wind turbine that can generate a nominal power output, and being fitted with a rotor including at least one rotor blade configured at an adjustable blade angle relative to said rotor, wherein the wind turbine is subjected to varying wind speeds, with the load on the turbine being less than the load at the turbine's nominal power-output due to low wind speeds (lower partial-load range), or the load is kept in a permissible range due to adjustment of the turbine at high wind speeds (upper partial-load range), the method comprising the steps of:

within a nominal power-output range, namely the power output range between a nominal wind speed at which the wind turbine output for the first time corresponds to the turbine's nominal power output and the maximum wind speed at which the turbine may be operating when delivering nominal power, which range follows operation within the lower partial-load range, operating the rotor at a substantially constant nominal rotor speed at which the wind turbine reaches its nominal power output at the nominal wind speed, until reaching a defined limit value; and after having crossed said limit value due to increasing wind speeds, operating the rotor within an upper partial-load range at a reduced rotor speed that is less than the rotor speed at which the wind turbine is able to deliver nominal power output, and wherein upon reaching the limit value, the rotor speed and, through a predetermined setpoint procedure, the setpoint rotor speed of a feedback loop are adjusted as a function of the rotor-blade angle.

2. The method as claimed in claim 1, wherein the limit value is a defined rotor-blade limit angle.

3. The method as claimed in claim 2, wherein the rotor-blade angle adjusting the rotor speed above the limit value is formed as a time and/or spatial average of several rotor-blade angles.

4. The method as claimed in claim 3, wherein the time average corresponds to a 10-60 sec. moving average.

5. The method as claimed in claim 3, wherein the time average corresponds to a 15 sec. moving average.

6. The method as claimed in claim 1, wherein the rotor-blade angle of the wind turbine is regulated as a function of measured or estimated loads on the wind turbine.

7. The method as claimed in claim 2, wherein above the limit value, the rotor speed is reduced as the rotor-blade angle increases.

8. The method as claimed in claim 1, wherein above the limit value, the generator torque of the generator mounted in the wind turbine is adjusted as a function of rotor speed.

9. The method as claimed in claim 8, wherein the generator torque is reduced as the rotor speed is decreased.

10. The method as claimed in claim 1, wherein the generator torque is regulated as a function of the rotor-blade angle.

11. The method as claimed in claim 10, wherein in the upper partial-load range and optionally also in the lower partial-load range the adjustment of generator torque takes place as a function of rotor speed and of blade angle.

12. The method as claimed in claim 1, wherein the power output of the wind turbine is adjusted as a function of the rotor speed above the limit value.

13. The method as claimed in claim 12, wherein the power output is reduced as the rotor speed decreases.

14. The method as claimed in claim 1, wherein above the limit value, regulation parameters are so changed relative to the wind turbine's normal operation by means of blade-angle dependent adaptation of the rotor speed and the setpoint rotor speed that the stability of regulation is maintained in the upper partial-load range, wherein one of the regulation parameters is pitch enhancement, wherein pitch enhancement for blade angles more than 30° is less than 20% of nominal pitch enhancement and/or for blade angles above 40° is less than 16% of nominal pitch enhancement.

15. A wind turbine that can generate a nominal power output and utilizing feedback control with a feedback loop, fitted with a rotor, comprising at least one rotor blade which is mounted on this rotor at an adjustable angle to it, wherein the wind turbine is subjected to varying wind speeds, with the load on the turbine being less than the load at the turbine's nominal power-output due to low wind speeds (lower-partial load range), or the load is kept in a permissible range due to adjustment of the turbine at high wind speeds (upper partial-load range), wherein the wind turbine within a nominal power-output range, namely the power output range between a nominal wind speed at which the wind turbine output for the first time corresponds to the nominal power output and the maximum wind speed at which the turbine may be operating when delivering nominal power, which range follows operation with the lower partial-load range, is operated at a substantially constant nominal rotor speed at which the wind turbine reaches its nominal power output at the nominal wind speed, until reaching a defined limit value and, after having crossed said limit value due to increasing wind speeds, is operated, within an upper partial-load range, at a reduced rotor speed that is less than the rotor speed at which the wind turbine is able to deliver nominal power output, wherein the turbine comprises a controller, the controller adjusting, upon reaching the limit value, the rotor speed and, through a predetermined setpoint procedure, the set-point rotor speed of a feedback loop, as a function of the rotor-blade angle.

* * * * *